No. 639,286. Patented Dec. 19, 1899.
D. F. PREVOST.
DEVICE FOR LIFTING AND TRANSPORTING TREES.
(Application filed Dec. 14, 1898.)

(No Model.) 3 Sheets—Sheet 1.

Witnesses
Chas. D. King.
S. Sweeney.

Inventor
Dwight F. Prevost
By Allen Webster
Attorney

No. 639,286. Patented Dec. 19, 1899.
D. F. PREVOST.
DEVICE FOR LIFTING AND TRANSPORTING TREES.
(Application filed Dec. 14, 1898.)

(No Model.) 3 Sheets—Sheet 2.

Witnesses
Chas. D. King.
L. Sweeney.

Inventor
Dwight F. Prevost
By Allen Webster
Attorney

No. 639,286. Patented Dec. 19, 1899.
D. F. PREVOST.
DEVICE FOR LIFTING AND TRANSPORTING TREES.
(Application filed Dec. 14, 1898.)
(No Model.) 3 Sheets—Sheet 3.

Witnesses
Chas. D. King.
S. Sweeney.

Inventor
Dwight F. Prevost
By Allen Webster
Attorney

UNITED STATES PATENT OFFICE.

DWIGHT F. PREVOST, OF NEW YORK, N. Y., ASSIGNOR OF TWO-THIRDS TO HARRY P. McTAGUE AND JAMES J. DOLLARD, OF MOUNT VERNON, NEW YORK.

DEVICE FOR LIFTING AND TRANSPORTING TREES.

SPECIFICATION forming part of Letters Patent No. 639,286, dated December 19, 1899.

Application filed December 14, 1898. Serial No. 699,239. (No model.)

*To all whom it may concern:*

Be it known that I, DWIGHT F. PREVOST, a citizen of the United States of America, residing in New York, in the county of New York and State of New York, have made new and useful Improvements in Devices for Lifting and Transporting Trees, &c., of which the following is a specification, reference being had to the accompanying drawings and letters of reference marked thereon.

Figure 1:
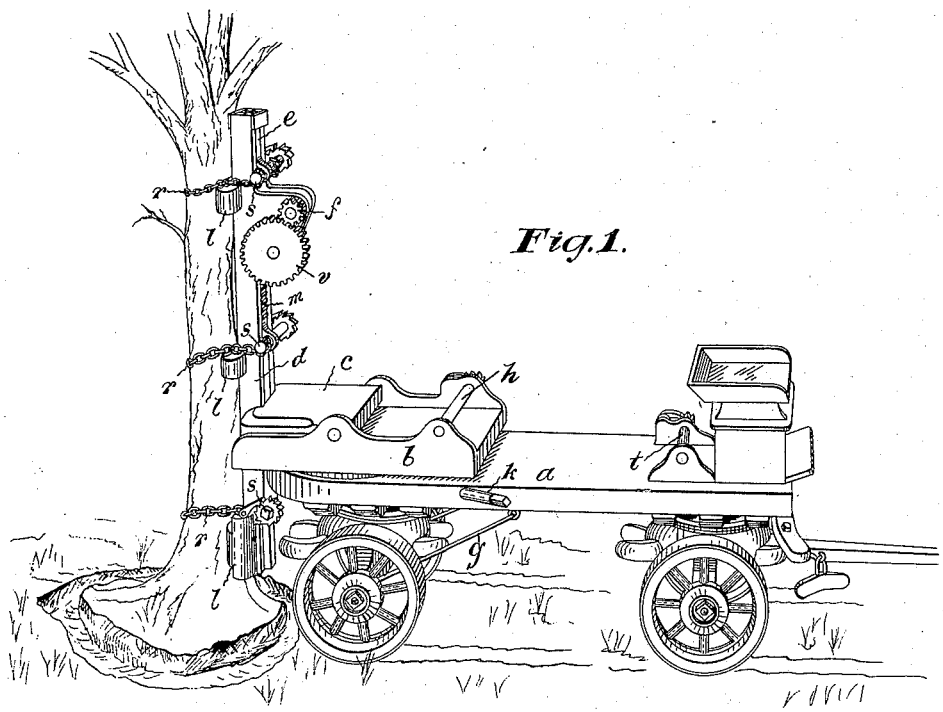
Figure 2:
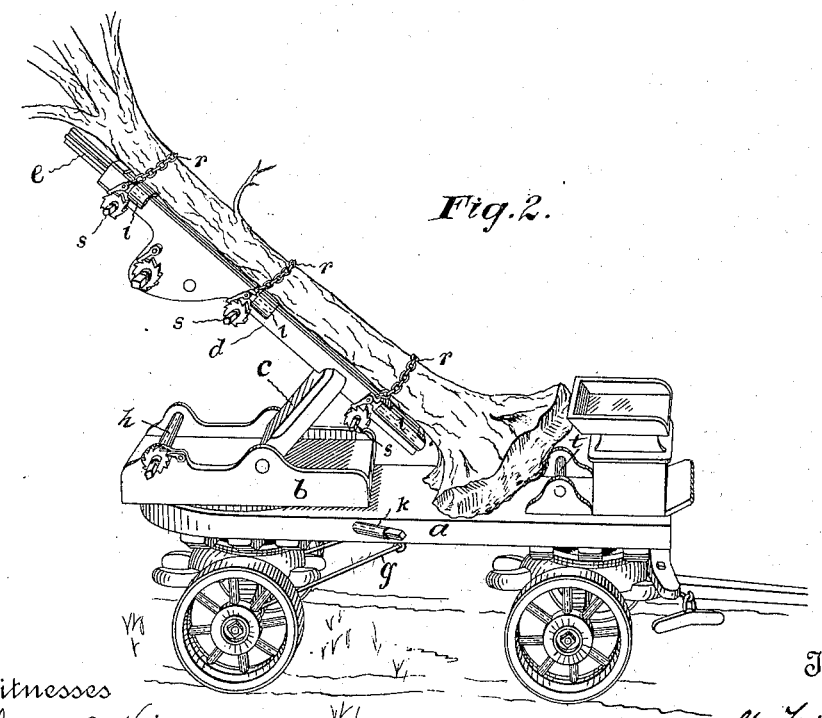
Figure 3:
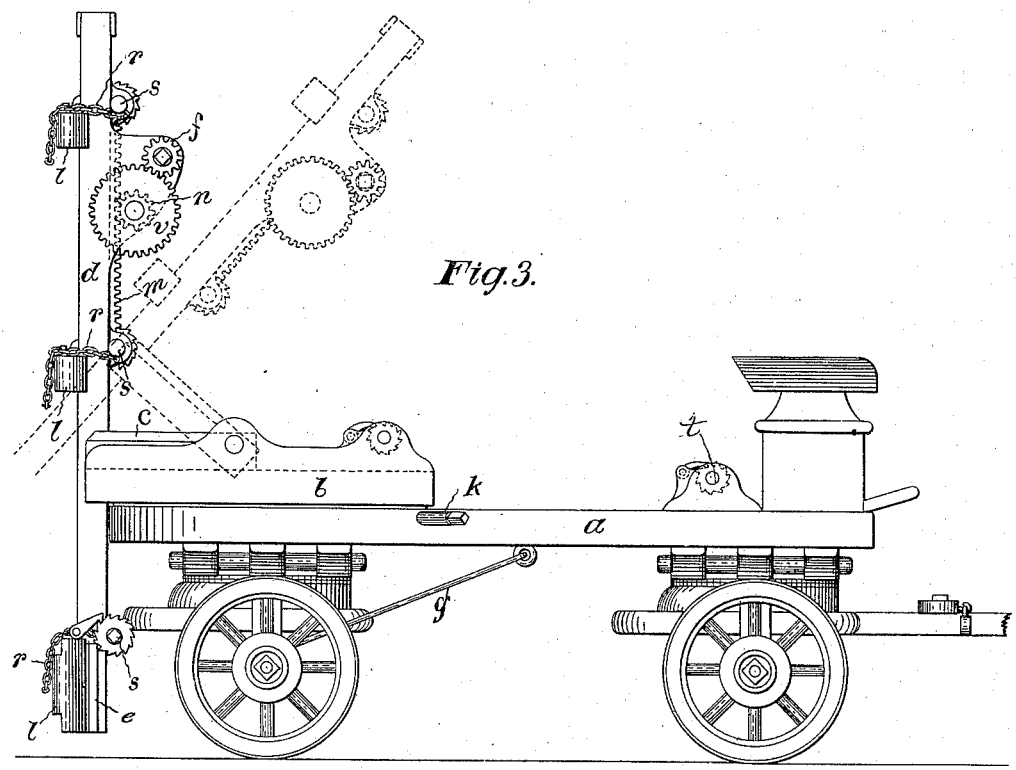
Figure 4:
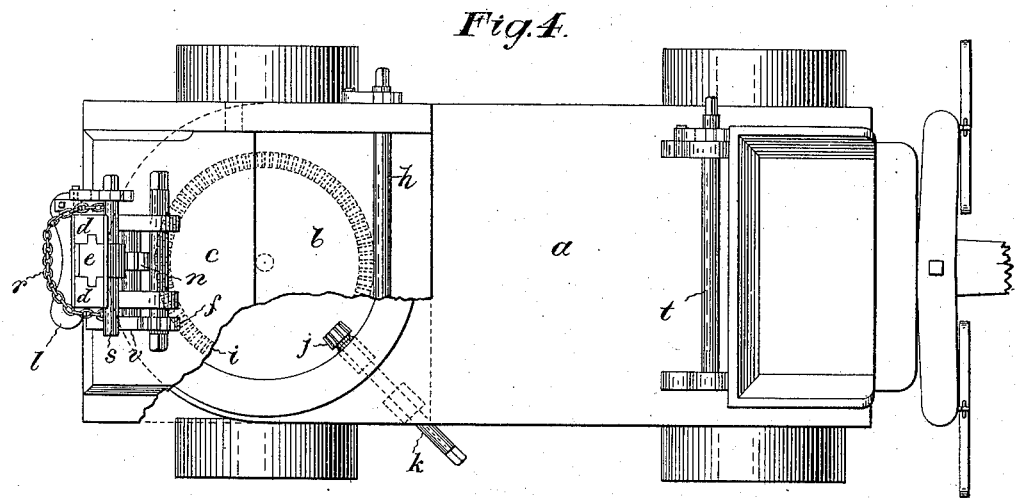
Figure 5:
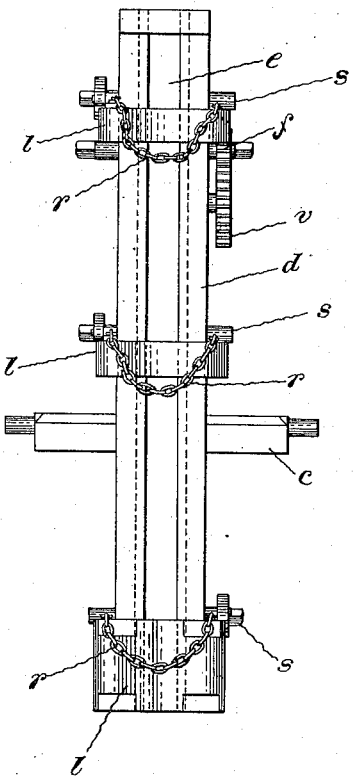

In the drawings, in which like letters of reference indicate like parts, Figure 1 is a perspective view of my device in position to lift a tree. Fig. 2 is a perspective view of the same with the tree lifted and loaded ready for transportation. Fig. 3 is a side elevation of my device. Fig. 4 is a plan view with a part of the turn-table broken away, and Fig. 5 is a view of the elevator-frame and elevation as seen from the left of Fig. 3.

The construction and operation of my device will be understood on reference to the drawings, in which I have illustrated a running-gear having a main platform $a$, suitably mounted thereon, and upon the rear portion thereof I mount a turn-table $b$, the latter being supported upon suitable ways and suitable mechanism being provided to revolve or turn the turn-table, that illustrated comprising a suitable gear $i$ and spur-gear $j$, mounted on a shaft upon which a crank may be mounted.

The elevator illustrated is mounted in suitable ways in the framework $d$, and a system of gears is arranged so that when the elevator is loaded the same may be readily lifted as desired. The elevator is also provided with saddle-blocks $l$, they being preferably recessed in a curved line for the reception of the trunk or body of a tree or pole. The tree or pole is thus mounted upon and secured to the elevator.

To the back of the elevator I secure a rack $m$ and provide a gear $n$ to mesh therewith, and in order to obtain the requisite leverage I prefer to mount a gear $v$ on the same shaft with the gear $n$ and to arrange a gear $f$ to mesh with the gear $v$, so that if a crank be mounted upon the shaft upon which the gear $f$ is mounted great lifting power may be exerted.

In order to bind the tree, pole, or other object to the saddle-blocks, I provide chains $r$, these being mounted at each end upon shafts $s$, and suitable ratchets with pawls to engage the teeth being also arranged to prevent accidental release of the binding-chains.

The block $c$, upon which the framework $d$ is mounted, is pivotally mounted upon the turn-table $b$, the pivotal point being well toward the center of revolution of the turn-table, so that in the operation of drawing th tree or pole toward a horizontal position it will also be carried vertically because of the fact that the pivotal point is at a distance from the object being lifted.

In the operation of the device the truck is moved so as to place the saddle-blocks against the tree or pole, and if a tree is being operated upon its trunk is first suitably covered with blankets or other means to prevent injury to it. It is then tightly secured to the saddle-blocks, and an ordinary tackle is run from the top portion of the framework or adjacent thereto to a suitable anchorage, causing the tree to be tilted toward the turn-table and at the same time lifted, and after the same has been carried to the desired height, occupying ordinarily a position substantially as indicated in dotted lines in Fig. 3, the turn-table is moved to carry the tree to the position shown in Fig. 2, allowing the stump to rest upon the platform $a$, after which the same is secured in position and transported to the desired location.

The operation of setting the tree or placing a post is, of course, the reverse of that first described, and it will be seen that trees and posts of great weight may be readily, easily, and conveniently handled and transported by the employment of my device.

In some cases in order to raise the object I may first operate the elevator, thus carrying the tree or other object vertically a short distance before the tilting operation, and in some cases in order to tilt the framework I may run a line or chain from the shaft $t$ to the top portion of the framework or adjacent thereto, and, the shaft being revolved with a crank or wrench, it will be seen that a powerful leverage will be exerted and objects of great weight readily lifted.

The running-gear is so constructed that both the front and rear axles may be turned upon their pivots, and is also so constructed that the tongue may be inserted at either end, and in order to maintain the wheels acting as rear wheels in fixed position during the transportation I provide rods $g$, the same being attached at one end to the platform $a$ and arranged to engage at their other ends the rear axles.

Having therefore described my invention, what I claim, and desire to secure by Letters Patent, is—

1. In combination with a suitable running-gear having a platform mounted thereon, a turn-table mounted on said platform, a reciprocating or longitudinally-movable elevator mounted on said turn-table, means for securing a tree or pole to said elevator, and means for raising and tilting said tree or pole after the same is secured to said elevator, substantially as shown.

2. In a tree-lifter, an elevator pivotally mounted to turn from a vertical to a horizontal position on a platform, said elevator extending above and below said platform when standing vertically, means to transport the platform and means to operate the elevator substantially as shown.

3. In a tree-lifter, a part as $c$ pivotally mounted upon a platform, a part normally extending above and below said platform adapted to be secured to a tree and fixed to the part $c$, means to bind the tree to said tree-receiving part and means to transport the whole substantially as shown.

4. In a tree-handling device, an elevator comprising suitable ways, a movable part mounted in said ways, saddle-blocks secured to said movable part, means to secure a tree or pole to the saddle-blocks, means to operate said movable part in said ways and means to transport the elevator and load carried by it substantially as shown.

5. In a tree-handling device the combination of a running-gear, a platform mounted thereon, an elevator adapted to lift the tree in a direct line independently, means to tilt the elevator, and binding devices to secure the tree to the elevator substantially as shown.

6. In a tree-handler, a suitable running-gear, a tree-attaching part, binding chains or cords to fasten the tree thereto, shafts to receive the binding means, and ratchets and pawls to prevent accidental release of the binding means substantially as shown.

7. In a tree-transporting device a suitable running-gear, having both axles pivotally mounted to their respective cross-ties or circles, a platform, and stay-pieces $g$ extending from the platform to the axle and detachably connected at one end substantially as shown.

8. The combination of a suitable running-gear, a platform thereon, a turn-table, an elevator-frame, a reciprocating or longitudinally movable elevator pivotally mounted on the turn-table and a winch-toll $t$ mounted on the platform substantially as shown.

DWIGHT F. PREVOST.

Witnesses:
HARRY P. MCTAGUE,
ALLEN WEBSTER.